Patented June 21, 1932

1,863,699

UNITED STATES PATENT OFFICE

WILLIAM SEGUINE, JR., OF NEWPORT, DELAWARE, ASSIGNOR, BY MESNE ASSIGNMENTS, TO THE GRASSELLI CHEMICAL COMPANY, OF CLEVELAND, OHIO, A CORPORATION OF DELAWARE

PREPARATION OF BLANC FIXE

No Drawing. Application filed August 17, 1929. Serial No. 386,742.

This invention relates to paint pigments. More specifically it relates to the preparation of the paint pigment known as blanc fixe, which chemically is barium sulfate.

Blanc fixe is, of course, well known in the art. It has, however, in the past been made probably exclusively by the reaction of soluble barium salts with soluble sulfates such as sodium or potassium sulfate or sulfuric acid.

An object of this invention is the manufacture of blanc fixe by a new method which utilizes waste solutions of barium chloride. A further object of the invention is the use in the manufacture of blanc fixe of a sulfate which is practically insoluble or only slightly soluble.

These objects are accomplished by the following invention which consists broadly in reacting a solution of barium chloride with gypsum. In this process precipitated gypsum which is substantially free from acid-insoluble impurities is used to react with a clear solution of barium chloride. A description of the process follows.

A clear solution of barium chloride is made up and is agitated in the presence of precipitated gypsum. The reaction under these conditions is slow but may be accelerated by heating, and/or by the addition of some substance such as hydrochloric acid which has the effect of increasing the solubility of gypsum.

The resulting pulp is removed from the agitation tank at the completion of the reaction to a washing system which may consist of a set of counter-current decantation thickeners, a plate and frame filter press equipped with provision for washing, or a rotary vacuum filter similarly equipped. The wash waters used in this step, if acidified with hydrochloric acid, will prevent the precipitation of any iron which may be present.

The pulp from the washing operation is now practically free from chlorine and may be neutralized with an alkali or an alkali earth. Barium carbonate has been found advantageous for this purpose. After the neutralization the blanc fixe is filtered, dried and disintegrated and is ready for use.

Some advantages of the invention are that the raw materials are cheap, that the resulting blanc fixe is free from sulphur, that the precipitated blanc fixe is finely divided and highly desirable for pigment purposes, that the blanc fixe is neutral and can easily be washed free from soluble impurities, and that the blanc fixe does not contain occluded salts that cannot be washed out.

As many apparently widely different embodiments of this invention may be made without departing from the spirit and scope thereof, it is to be understood that I do not limit myself to the specific embodiments thereof except as defined in the appended claims.

I claim:

1. The method of preparing blanc fixe from barium chloride consisting in thoroughly mixing an acidified solution of barium chloride with gypsum, heating, washing with acidified water, and neutralizing.

2. The method of preparing blanc fixe from barium chloride consisting in thoroughly mixing a hydrochloric acid acidified solution of barium chloride with gypsum, heating, washing with acidified water, neutralizing with an alkali, filtering, drying, and disintegrating.

3. The method of preparing blanc fixe which comprises mixing a hydrochloric acid acidified solution of barium chloride with precipitated gypsum, heating and agitating said mixture and separating the barium sulfate formed from the calcium chloride solution as soon as the reaction is substantially complete.

In testimony whereof, I affix my signature.

WILLIAM SEGUINE, JR.